United States Patent
Courpet et al.

(10) Patent No.: US 9,366,370 B2
(45) Date of Patent: Jun. 14, 2016

(54) ANTI-BUCKLING COUPLING DEVICE FOR PIPING

(75) Inventors: Alexis Courpet, Fronton (FR); Thomas Barre, Toulouse (FR); Olivier Bourbon, Aucamville (FR); Matthieu Biteau, Toulouse (FR); Jean-Marc Roques, Toulouse (FR); Cedric Sable, Toulouse (FR); Sebastien Escande, Pins-Justaret (FR)

(73) Assignee: AIRBUS OPERATIONS S.A.S., Toulouse (FR)

( * ) Notice: Subject to any disclaimer, the term of this patent is extended or adjusted under 35 U.S.C. 154(b) by 786 days.

(21) Appl. No.: 13/545,517

(22) Filed: Jul. 10, 2012

(65) Prior Publication Data

US 2013/0181441 A1    Jul. 18, 2013

(30) Foreign Application Priority Data

Jul. 20, 2011  (FR) .................................. 11 56588

(51) Int. Cl.
| | | |
|---|---|---|
| F16L 27/00 | (2006.01) | |
| F16L 27/12 | (2006.01) | |
| F16L 27/02 | (2006.01) | |
| F16L 39/00 | (2006.01) | |
| F16L 39/04 | (2006.01) | |

(52) U.S. Cl.
CPC ............... *F16L 27/12* (2013.01); *F16L 27/026* (2013.01); *F16L 39/005* (2013.01); *F16L 39/04* (2013.01)

(58) Field of Classification Search
USPC ................ 285/145.1, 3, 4, 223, 121.1, 121.2, 285/123.15, 298, 302
See application file for complete search history.

(56) References Cited

U.S. PATENT DOCUMENTS

| | | | | |
|---|---|---|---|---|
| 2,818,232 A | * | 12/1957 | Osmun .......................... 175/293 |
| 3,001,804 A | * | 9/1961 | Tomlinson et al. ....... 285/137.11 |
| 5,390,960 A | * | 2/1995 | Blake ................................ 285/3 |
| 6,056,329 A | | 5/2000 | Kitani et al. |
| 2010/0295293 A1 | | 11/2010 | Healy et al. |

FOREIGN PATENT DOCUMENTS

| | | |
|---|---|---|
| EP | 0 870 965 A1 | 10/1998 |
| EP | 2 261 543 A2 | 12/2010 |
| JP | 2004-324769 | 11/2004 |

OTHER PUBLICATIONS

French Preliminary Search Report and Written Opinion issued Jan. 17, 2012, in French 1156588, filed Jul. 20, 2011 (with English Translation of Categories of Cited Documents).

* cited by examiner

*Primary Examiner* — Aaron Dunwoody
(74) *Attorney, Agent, or Firm* — Oblon, McClelland, Maier & Neustadt, L.L.P

(57) ABSTRACT

A coupling device for piping including a duct; a coupling with a hermetic longitudinal sliding connection with an extremity of the duct along a total distance parallel to a longitudinal axis of the duct; a device to stop the translational movement of a first extremity of the duct in the coupling for a travel distance less than the total distance. The device being withdrawable for a defined compression condition of the duct.

10 Claims, 3 Drawing Sheets

ANTI-BUCKLING COUPLING DEVICE FOR PIPING

BACKGROUND OF THE INVENTION

The invention relates to an anti-buckling coupling device for piping. The invention is more specifically, but not exclusively, designed to realize couplings intended for joining ducts in an aircraft, and more specifically for fuel piping made from double-walled ducts.

In many vehicles, especially aircraft, rigid piping carrying different kinds of fluids is fastened to said vehicle's structure by anchor points. Advantageously the couplings between two ducts of the piping are placed at the location of these anchor points, so that the weight of said couplings is taken up by the structure of the vehicle and not by the piping. Thus, said couplings are linked to the ducts by means of a groove connector, or sphere cylinder, i.e. a connector that combines a swivel connection and a sliding connection along the longitudinal axis of the duct. This connector allows the alignment faults between the ducts forming the piping and the variations in distance between the anchor points to be accommodated; these faults or these variations result from:
  tolerances, either in the manufacture of the ducts or in the positioning of the anchor points in the vehicle's structure, and
  differential deformations of the piping and the structure when they are subjected to the vehicle's operating stresses.

These degrees of freedom at the couplings are realized with limited amplitudes so that hermeticity is always guaranteed and the ducts thus assembled cannot become disconnected.

FIG. 1 schematically illustrates a duct assembly relative to the prior state of the art. As FIG. 1A shows, according to this simplified representation, the ducts (101, 102, 103) forming the piping are straight ducts, arranged along a rectilinear alignment (110) of their axes. Each duct comprises a skirt (121, 122) at each of its extremities. These skirts are inserted into couplings (131, 132); these couplings are fixed to a structure, for example the fuselage of an aircraft, by anchor points (191, 192). Each coupling comprises sealing means (155) producing a substantially elastic annular linkage between the skirt (121, 122) of the duct and the interior bore of the couplings (131, 132). The exterior diameter of the skirt (121) is smaller than the interior diameter of the coupling (131) such that outside the contact with the sealing means (155), the skirt (121) has a radial gap (r) with the interior bore of the coupling (131). Thus, in each coupling, the skirt of each duct has a swivel connection with said duct via the annular contact with the sealing means (155) and the elasticity of these means. As FIG. 1B shows, the degrees of liberty introduced by this swivel connection permit a misalignment of the couplings (131, 132) with no damage and no assembly difficulty for the duct (101). The angle of misalignment allowed depends on the flexibility of the sealing means (155), the radial gap (r) between the skirts (121, 122) and the bores of the ducts (131, 132) and the insertion length (L) of the skirt (121, 122) into the bore of the coupling (131, 132). Thus, for the same allowed angle of misalignment, the longer the insertion length (L) of the skirt into the coupling, the greater the radial gap (r) must be.

As FIG. 1C shows, the length of the skirts (121, 122) and their implantation length (L) in the couplings are determined by the connector's ability to accommodate variations in distance (Δd) between the couplings (131, 132). These variations in distances arise from positioning tolerances for the couplings in the structure and elastic variations in distances between the couplings; these elastic variations result from the structure's response to the operating stresses to which it is subjected. The couplings (131, 132) comprise translational movement stoppers (165) to avoid the accumulation of elastic deformations over time leading to one extremity of the duct becoming disconnected from the coupling. Thus, the implantation distance (L) of the skirts (121, 122) in the couplings is determined as follows:
  when the two couplings (131, 132) are in their closest relative position (figure C1), the two skirts (121, 122) are in contact with the translational movement stopper means (165);
  when the couplings (131, 132) are in their most distant relative position (figure C2), one of the skirts (121) is in contact with the translational movement (165) stopper (165) in its respective coupling (131) while the extremity of the other skirt (122) is at a distance from the translational movement stopper (165) in its respective coupling (132), which distance is equal to the maximum variation (Δd) in distance between the two couplings while always ensuring contact with the sealing means (155).

Thus, whatever the position of the duct between the two couplings, it cannot become disconnected from one of the couplings and, as a result, the implantation distance of the skirts in each coupling is equal to the maximum potential variation in distance (Δd) between the anchor point (191, 192), increased, where appropriate, by a safety coefficient and a margin to take into account the cumulative influence of the misalignment. The potential variation (Δd) in distance between the couplings has three origins:
  i. the manufacturing tolerances of the ducts, the couplings and positioning of the anchor points bearing said couplings;
  ii. the elastic variations in distance between the anchor points, as a result of the structure's nominal operating stresses;
  iii. and, for some piping, fuel piping in particular, the exceptional variations in distance between the anchor points.

The exceptional variations in distance occur in situations referred to as crash situations. The goal is to preserve the hermeticity of the piping in these exceptional conditions to prevent the fluid they transport spilling into the vehicle. Thus, a significant lessening of the distance between anchor points can produce a compression of the duct, which is therefore likely to be deformed by buckling and to break. These exceptional distortions of the structure are likely to have high values; thus, taking them into account in the implantation length of the skirts according to the principle of the prior state of the art described above, while ensuring that the accumulation of elastic deformations does not result in a disconnection of the ducts, leads to especially long lengths of skirts and implantation lengths of these skirts in the couplings. In order to preserve the capacity to accommodate misalignments, this increased implantation length requires an increase in the radial gap (r) of the skirts in the couplings. Thus, taking these exceptional constraints into account according to the design principles of the prior state of the art leads to a significant increase in the mass of the piping.

BRIEF SUMMARY OF THE INVENTION

To overcome the disadvantages of the previous state of the art, the invention proposes a coupling device for a duct, comprising:
  a duct;

a coupling comprising means for realizing a hermetic longitudinal sliding connection with an extremity of the duct along a total distance d parallel to the axis, referred to as longitudinal, of said duct;

means of stopping the translational movement of the first extremity of the duct in the coupling for a travel d1 less than d;

such that said translational movement stopper means are withdrawable for defined compression conditions of the duct.

Thus, the additional travel (d−d1), referred to as the safety travel and corresponding to exceptional stress conditions, can be placed at only one extremity of the duct, with no negative effect on the safety of the device in either normal conditions or exceptional conditions.

The term "withdrawable" means that the translational movement stopper means are able to be withdrawn and thus release said translational movement as a result of the retraction, failure, folding, tearing or disintegration of said means, without this being an exhaustive list.

The invention can be implemented according to advantageous embodiments, described below, each of which is to be considered individually or in any technically operable combination.

According to a first embodiment of the device that is the subject of the invention, the translational movement stopper means are interposed between the duct and the coupling; they are withdrawn by shearing along a longitudinal direction under the effect of a force determined by the risks of the duct's buckling. Therefore, the conditions in which the additional translational movement of the duct in the coupling must be triggered can easily be calibrated by the shear resistance area of said means.

According to a first variant of this first embodiment, the translational movement stopper means comprise a ring attached by a circumferential interface; the withdrawal of said ring is realized by the shearing of this interface. Thus, as the failure of the interface occurs circumferentially, and according to a longitudinal shearing, it does not introduce parasitic bending effects in said duct.

According to a second variant of the first embodiment of the device that is the subject of the invention, the translational movement stopper means comprise elements, referred to as fusible elements, extending in a radial direction from the duct, and comprised in an assembly comprising rivet, pin and rod. This is an economical embodiment.

According to a second embodiment of the device that is the subject of the invention, the translational movement stopper means comprise a spacer extending parallel to the axis of the duct, the withdrawal of which is realized by the buckling of said spacer under the effect of a force determined by the risks of the duct's buckling. Using the buckling of a spacer makes it possible to limit the shock effect on the duct when the safety travel is triggered.

Advantageously, the translational movement stopper means are fixed on the exterior wall of said duct outside the coupling. Therefore, a visual inspection of said couplings immediately shows that the safety travel of the device that is the subject of the invention has been triggered, testifying to the occurrence of an abnormal stress on the structure and a risk of degradation to the piping.

Advantageously, the coupling comprises sealing means in contact with a seat on the exterior wall of the duct and the translational movement stopper means comprise a ring able to slide on said seat of the exterior wall. In this way the withdrawal of said means does not degrade the hermeticity of the duct in the coupling.

According to this last embodiment, the duct is a double-walled type. Therefore the device that is the subject of the invention can advantageously be used in the aeronautics field for fuel piping connections, the hermeticity of the exterior wall with regard to the coupling being preserved if the safety travel is triggered.

Advantageously, the extremity of the double-walled duct penetrating into the coupling consists of a single-wall skirt; the distance between the longitudinal extremity of the internal wall of the duct and the longitudinal extremity of the skirt introduced into the coupling is greater than or equal to (d+d1). In this way, hermeticity of the coupling is achieved inside and outside the skirt, which simplifies the coupling and allows the swivel connection to be retained.

Advantageously the longitudinal extremity of the internal wall of the double-walled duct is always at a distance greater than or equal to (d−d1) from the duct-side longitudinal extremity of the coupling when the translational movement stopper means are not withdrawn. Thus triggering of the safety travel, whatever the duct's longitudinal position in the coupling, is not likely to degrade the interior duct carrying the fluid and the safety of the double-walled duct is fully preserved, including in conditions of exceptional stresses.

BRIEF DESCRIPTION OF THE SEVERAL VIEWS OF THE DRAWINGS

The invention is described below according to various preferred, non-limiting embodiments and with reference to FIGS. 1 to 6 in which.

DETAILED DESCRIPTION OF THE INVENTION

The device that is the subject of the invention is shown in these figures in an embodiment utilizing double-walled piping. The person skilled in the art will adapt the realization, in the light of these lessons, to cases implementing single-walled piping.

Figure 1:
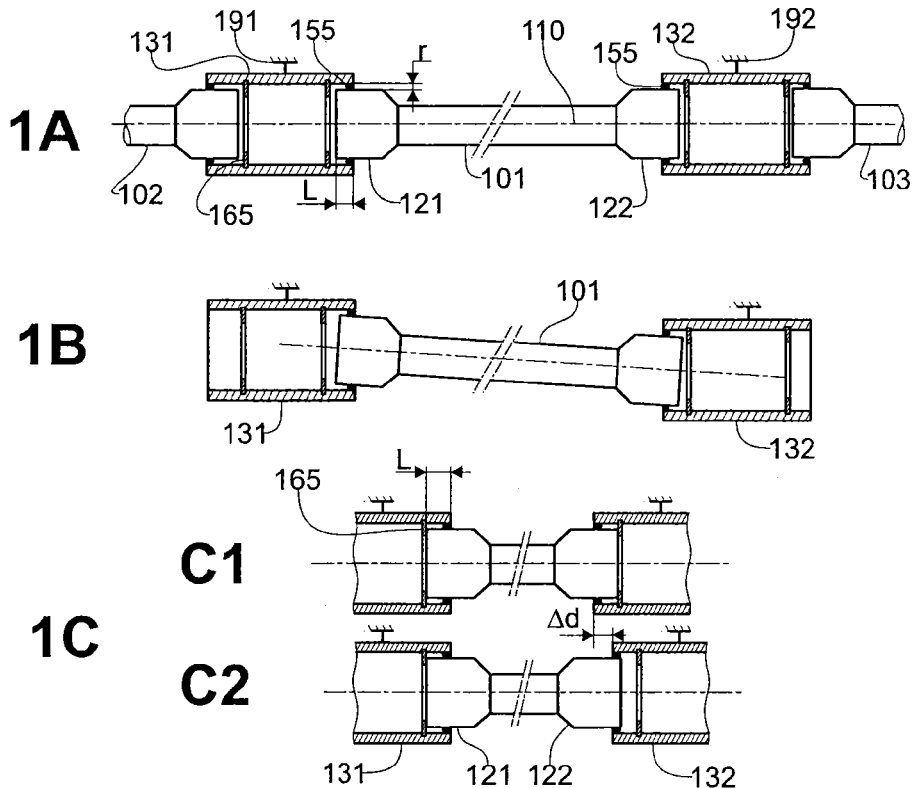
FIG. 1, relative to prior state of the art, shows in a cross-section view the principle for connecting the ducts of a pipe.
Figure 2:
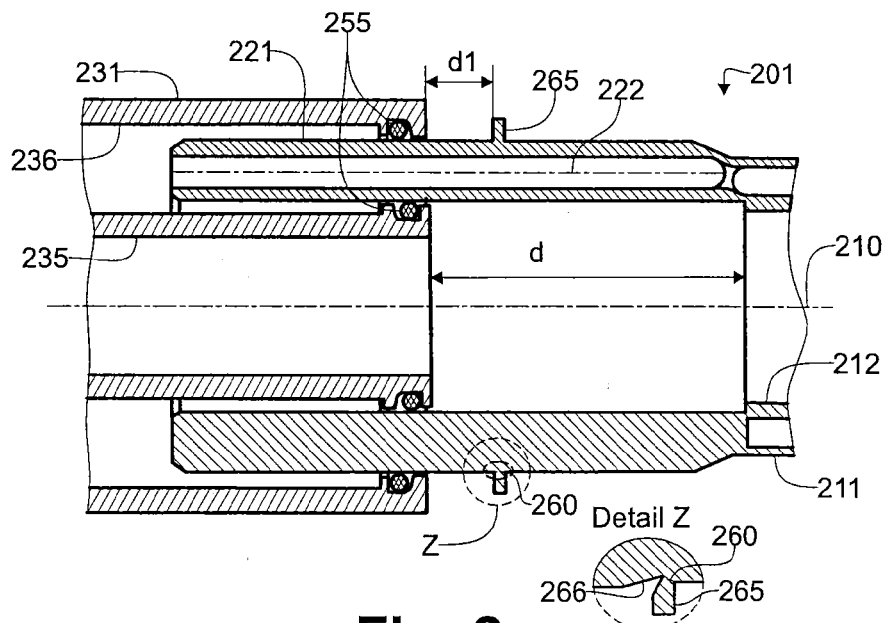
FIG. 2 represents an example of realization of the device that is the subject of the invention in a partial longitudinal cross-section view, implementing a double-walled coupling and a duct.

As shown in FIG. 2, according to an example of realization, the duct (201) with a double wall (211, 212) penetrates into the coupling (231) via a skirt (221) with a single wall; said wall is pierced by bores (222) communicating with the area between the walls (211, 212) of the duct (201). Said duct (201) extends along a longitudinal axis (210).

Figure 6:
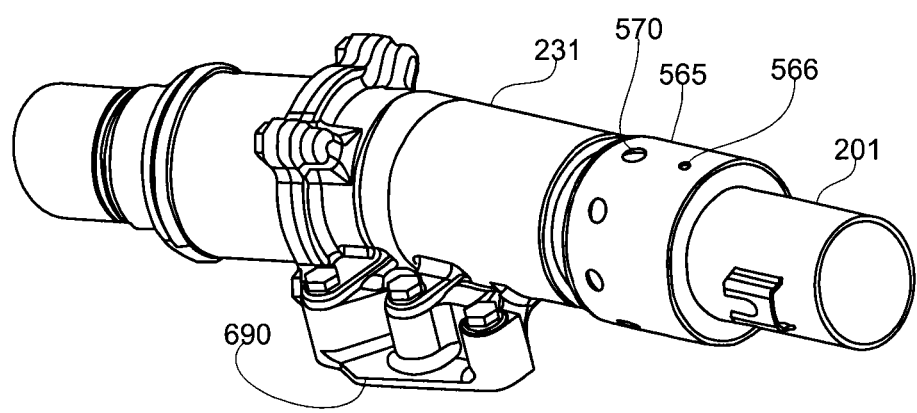
FIG. 6 is a perspective view of an example of realization of the device that is the subject of the invention according to the embodiment of FIG. 5.

As FIG. 6 shows, an anchor point (690) connects the coupling (231) completely to a support structure (not shown), for example to the fuselage of an aircraft.

Returning to FIG. 2, seals (255), e.g. O-rings, provide hermeticity on both sides of the wall of the skirt (221) with the coupling (231); the only contact between said coupling (231) and the skirt is via these O-rings; this connection allows the skirt (221) to swivel in the coupling (231).

The coupling (231) comprises an interior wall (235) delimiting a duct in hydraulic communication with the interior duct delimited by the interior wall (212) of the piping, and an exterior wall (236). The area between the exterior wall (236) and interior wall (235) of the coupling (231) is in hydraulic communication, via the bores (222) of the skirt (221), with the area forming the duct between the interior and exterior walls (212, 211) of the piping. The seals (255) also isolate the interior and exterior ducts of the piping inside the coupling (231), such that the separate hydraulic continuity of the interior and exterior ducts of the piping is preserved on passing through couplings.

According to this example of realization, the maximum longitudinal travel, parallel to the axis (210), of the duct (201) in the coupling (231) is determined by the distance (d) between the extremities of the interior ducts of the coupling (231) and the duct (201) of the piping, inserted into this coupling. The extension length of said coupling (231), parallel to the longitudinal axis (210), is chosen so that during a translational movement of this length (d) the extremity of the skirt (221), introduced in the coupling (231), does not meet any other obstacle.

In this way, the length (d) takes into account the three sources of variation in position for the ducts of the piping with respect to the anchor points:
 i. positioning and manufacturing tolerances;
 ii. deformations of the structure on which the couplings are anchored, deformations relating to said structure's operating stresses;
 iii. deformations of the structure relating to exceptional stresses.

According to the example of realization of the invention, only one extremity of the duct (201) is connected to a coupling (231) allowing a longitudinal travel of said duct in the coupling for a distance d. The other extremity of the duct (201) is connected to a coupling (not shown) that only allows travel for a length d1, less than d, and does not take into account the exceptional deformations. Thus, to avoid the duct (201) becoming disconnected from the coupling placed at its other extremity under the cumulative effect of the relative longitudinal movements of said duct (201), the device that is the subject of the invention comprises means (265) for limiting this longitudinal travel to a length d1. Therefore, in nominal situations, the duct (201) moves longitudinally in the coupling (231) by a maximum travel equal to d1. The safety travel (d−d1), corresponding to cases of exceptional stresses, becomes available through the withdrawal of these translational movement stopper means (265). According to the example of realization shown in FIG. 2, the translational movement stopper means (265) are fixed on the skirt (221) by a circumferential interface (260). The cross-section of this interface (260) is chosen so that in the event of an exceptional stress the translational movement stopper means (265), meeting the extremity of the duct (231), shear along this interface (260) and thus release the additional travel (d−d1). According to this embodiment, translational movement stopper means (265) can be mounted on the surface of the skirt (221), e.g. by welding, or be an integral part of the skirt (221). Whether they are mounted on or integrated into the skirt (221), said translational movement stopper means (265) can be withdrawn by the shearing failure of the interface (260) with the skirt, or by folding along this interface. Advantageously, as shown in detail Z of FIG. 2, machining forming an incipient failure or folding line can be carried out, so that during its folding or failure, this stopper (265) does not result in a distortion in the shape of the skirt (221) that would stop it sliding in the coupling (231).

Figure 3:
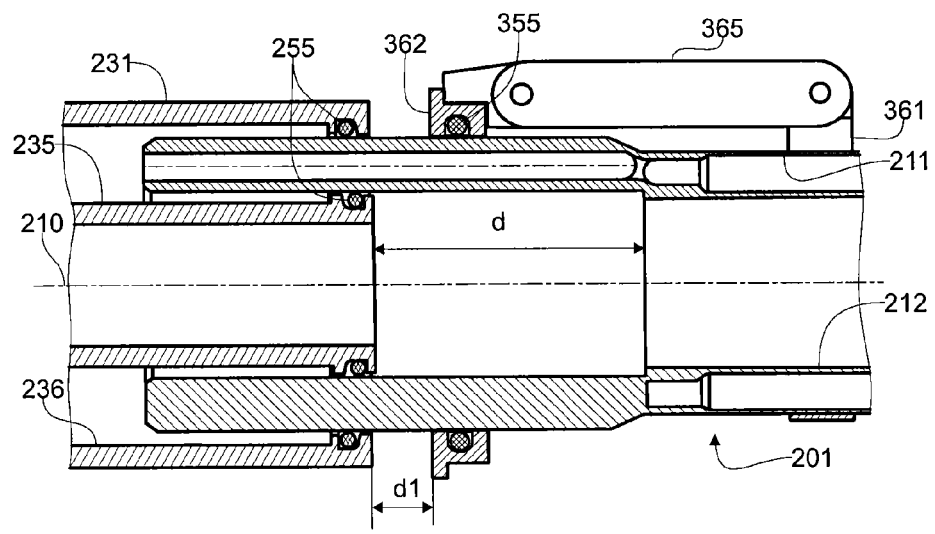
FIG. 3 illustrates, in the same cross-section as FIG. 2, another example of realization of the device that is the subject of the invention.

As shown in FIG. 3, according to another embodiment, the withdrawable means of limiting the travel of the skirt (221) in the coupling (231) to a value of d1 comprise a mount (361) welded onto the exterior wall (211) outside the duct (201) penetrating into the coupling (231).

Figure 4:
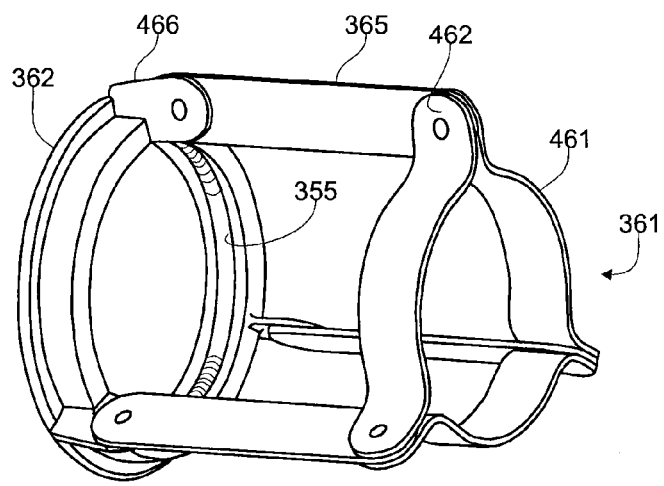
FIG. 4 is a perspective view of translational movement stopper means used according to the embodiment illustrated in FIG. 3.

As FIG. 4 shows, said mount (361) comprises a ring (461), bearing wings (462) extending radially. Spacers (365), in the form of struts extending parallel to the longitudinal direction, are connected to each of these wings (462) by a pivoting linkage with an axis perpendicular to the longitudinal direction. The other extremity of the spacers (365) is connected to a support ring (362); this support ring also comprises wings (466) supporting means of pivoting linkage with the extremity of the spacer.

Returning to FIG. 3, the support ring (362) is centered on the skirt (221) of the duct outside the coupling, in a sliding connection with a longitudinal axis (210) with said skirt, such that the maximum distance between said support ring (362) and the extremity of the coupling (231) is equal to d1. Therefore, in nominal operation the movement of the duct (201) in the coupling (231) is limited to this travel d1 by the position of the support ring (362). In exceptional stress cases, the number and cross-section of the spacers (365) are calculated so that said spacers deform by buckling. Unlike the previous embodiment, FIG. 2, where a stress peak is necessary for the shearing of the translational movement stopper and the travel of the skirt (221) in the coupling (231) then taking place freely, the buckling of the spacers (365) applies an almost constant force against the penetration of the skirt (221) in the coupling (231) along the safety travel (d−d1).

As FIG. 3 shows, this embodiment also has the advantage of not degrading the seat of the skirt in contact with the seals (255), even if the safety travel is triggered. In effect, the contact between the ring (362) and the exterior surface of the skirt (221) can be achieved by a low-hardness part (355), thus avoiding any risk of marking. According to this example of realization, FIG. 3, this low-hardness part is made from a retaining ring (355) placed in a housing of the ring (362). Said retaining ring can advantageously be made of polytetrafluoroethylene or any other material with suitable friction characteristics.

Figure 5:
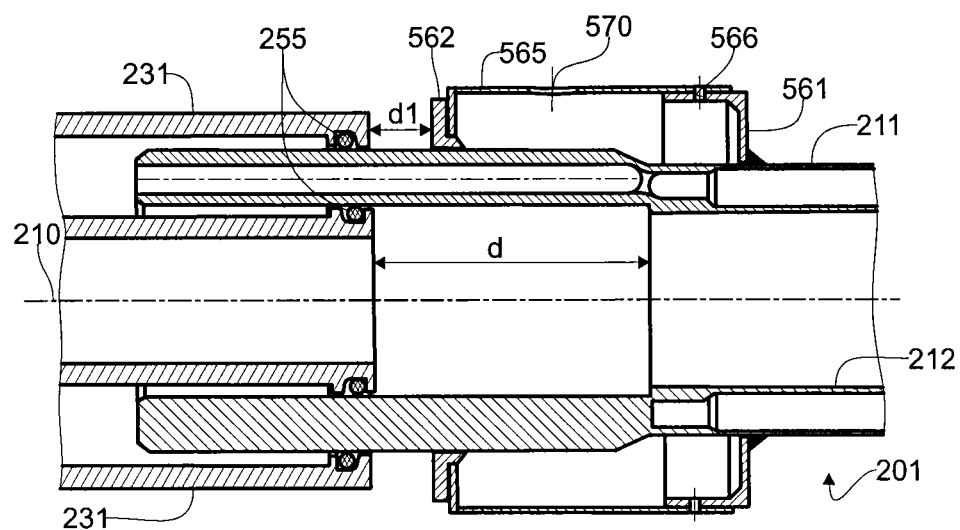
FIG. 5 illustrates, in the same cross-section as FIGS. 2 and 3, another example of realization of the device that is the subject of the invention.

As shown in FIG. 5, according to another example of realization, the means of stopping the translational movement of the duct (201) in the coupling (231) comprise a first cylindrical spacer (561) welded to the outside of the duct (201) on its exterior wall (211). This first spacer (561) fits longitudinally into a second cylindrical spacer (565), which has a larger diameter. The two spacers (561, 562) are completely connected to each other by fastening elements (566), referred to as fusible, such as rods, pins or rivets, extending radially between the two spacers. The extremity opposite this linkage of the second spacer (565) is likely to come into contact with the extremity of the coupling (231) and thus limit the travel of the duct (201) in said coupling (231) to a value of d1. Advantageously, this extremity of the second spacer (565) is centered on the skirt (221) of the duct by a ring (561) made from a material such as polytetrafluoroethylene (PTFE), whose friction on the skirt (221) is not likely to degrade the seat of the seals (255) producing the hermeticity of the connection with the coupling (231).

The cross-section of the fusible fastening elements (566) between the two spacers (561, 565) is calculated so that said elements (566) fail by shearing in conditions corresponding to the exceptional stress conditions, justifying the triggering of the safety travel (d–d1), and thus allowing the relative longitudinal movement of the two spacers (561,565).

Advantageously, radial holes (570) made in the second spacer (565) make it possible to avoid condensation water accumulating in the area between said spacer and the exterior wall of the duct (201).

The description above and the examples of realization show that the invention has achieved the goals it envisages, in particular it makes it possible to provide a safety travel in a coupling at only one of the extremities of a duct, without risking said duct becoming disconnected from the coupling at the other end. Thus the added mass relating to the introduction of this safety travel is reduced compared to the solutions known in the prior state of the art.

The invention claimed is:

1. A coupling device for a duct, comprising:
    a duct,
    a coupling comprising seals that hermetically slide with an extremity of the duct along a total distance d parallel to a longitudinal axis of said duct; and
    a stopper that stops a translational movement of the extremity of the duct within the coupling for a travel of d1 which is less than d, the stopper extending in a radial direction of the duct from an outer peripheral surface of the duct, wherein
    the stopper includes a region adjacent to the outer peripheral surface configured to shear the stopper from the duct in a direction parallel to the longitudinal axis, and
    the coupling includes an inner wall and an exterior wall which is radially outward from the inner wall, the extremity of the duct sliding between the inner wall and the outer wall.

2. The device according to claim 1, wherein the stopper is fixed on said duct outside the coupling.

3. The device according to claim 1, wherein the stopper is sheared from the coupling under a force determined by risks of buckling of the duct.

4. The device according to claim 1, wherein the seals include a first seal on the inner wall and a second seal on the exterior walls, the first seal and the second seal are each slidable on the outer peripheral surface of the duct.

5. The device according to claim 1, wherein the extremity of the duct penetrating into the coupling is a single-wall skirt, and a distance between a longitudinal extremity of an internal wall of the duct and a longitudinal extremity of the skirt in the coupling is greater than or equal to (d+d1).

6. The device according to claim 5, wherein the longitudinal extremity of the internal wall of the duct is always at a distance greater than or equal to (d–d1) from a duct-side longitudinal extremity of the coupling when the stopper is fixed to the duct.

7. The device according to claim 1, wherein the stopper includes a face substantially perpendicular to the outer peripheral surface of the duct, the face configured to contact an end of the coupling when the duct travels the distance d1 within the coupling.

8. The device according to claim 1, wherein the region includes an incipient failure or a folding line.

9. The device according to claim 8, wherein the incipient failure is a machined recess in the stopper.

10. The device according to claim 1, wherein a width of the stopper at the region is less than a width of stopper at an end distal to the region.

* * * * *